United States Patent [19]

Simon et al.

[11] 3,709,135

[45] Jan. 9, 1973

[54] SHUTTER CONTROL APPARATUS

[75] Inventors: Horst Simon; Wilhelm Birkenmaier, both of Stuttgart, Germany

[73] Assignee: Eastman Kodak Company, Rochester, N.Y.

[22] Filed: June 14, 1971

[21] Appl. No.: 152,920

[30] Foreign Application Priority Data

June 16, 1970 Germany....................G 70 22 584.2

[52] U.S. Cl....................95/60, 95/10 CT, 95/53 EB
[51] Int. Cl..............................G03b 7/08, G03b 9/58
[58] Field of Search ....95/10 C, 10 CT, 53 R, 53 EA, 95/53 EB, 58, 59, 60

[56] References Cited

UNITED STATES PATENTS

| | | | |
|---|---|---|---|
| 3,555,986 | 1/1971 | Paulik | 95/53 EB X |
| 3,459,112 | 8/1969 | Stamp et al | 95/60 |
| 3,476,031 | 11/1969 | Stamp | 95/53 EB X |

Primary Examiner—Joseph F. Peters, Jr.
Attorney—W. H. J. Kline et al.

[57] ABSTRACT

Switch actuating apparatus for use in a camera of the type including switch means that are to be actuated in a predetermined relationship to operation of camera shutter means. The apparatus includes a spring biased, switch actuating member which is movable between first and second switch actuating positions, and a releasable latching lever having a first arm that retains the switch actuating member in the first switch actuating position prior to operation of the shutter means. A second arm of the latching lever is positioned to be contacted by the operated shutter means. The contact of the second arm by the shutter means moves the first arm out of the retaining position of the switch actuating member, and the switch actuating member moves, under the spring bias, to the second switch actuating position.

2 Claims, 2 Drawing Figures

HORST SIMON
WILHELM BIRKENMAIER
INVENTORS

HORST SIMON
WILHELM BIRKENMAIER
INVENTORS

BY

ATTORNEYS

SHUTTER CONTROL APPARATUS

BACKGROUND OF THE INVENTION

1. Field of the Invention

This invention relates to automatic shutter controls and more particularly to such shutter controls that include electronic timing circuits for controlled time exposures.

2. Description of the Prior Art

Many camera shutter mechanisms are presently known which automatically establish the duration of an exposure interval. Generally, the interval is established as a function of object scene light; and typically, such shutter mechanisms have an opening shutter blade and a closing shutter blade for opening and closing an exposure aperture, respectively. The opening shutter blade is released, or moved to uncover the exposure aperture, in response to operation of a camera release mechanism, which often includes an impact driver as a means to open the opening shutter blade. The closing shutter blade may be releasably held in an open condition in relation to the exposure aperture by a detent and an electromagnet. The electromagnet operates in response to operation of a timing circuit to release the closing blade at the end of the exposure interval. Typically, the timing circuit is energized as a switch is actuated by depressing the camera release mechanism, and the timing is initiated by the opening blade as it moves to open the exposure aperture. Although these mechanisms operate satisfactorily, the initiation of the timing interval must be exact for proper exposure.

SUMMARY OF THE INVENTION

Therefore, it is an object of the present invention to provide improved shutter control apparatus for use in a camera whereby an exactly defined initiation of the time exposure is provided.

It is another object of the present invention to provide an improved shutter control apparatus that prevents the initiation of the timed exposure until after the opening shutter blade has been released to open the exposure aperture.

These and other objects are accomplished according to the invention by a control member in combination with shutter apparatus of the type that may include an opening shutter blade and a closing shutter blade, each movable in relation to an exposure aperture for controlling the passage of scene light therethrough; and actuatable switch means which initiate a timing function for establishing a controlled time between the opening and closing of the aperture. The control member, in one illustrative embodiment of the invention, may include a bias spring, and may be releasably retained in a first position for movement under the bias to a second position as the opening blade opens the exposure aperture. In the second position, the control member is disposed to actuate the switch means to initiate the timing function substantially in a timed relation to the opening of the exposure aperture to pass scene light therethrough.

A further feature of the invention provides for a locking mechanism for the control member, which locking mechanism is controlled by the movement of the opening of the shutter means. The locking mechanism is operable to release the control member, to actuate the timing function to begin the time interval, only after the shutter means has moved to open the exposure aperture.

BRIEF DESCRIPTION OF THE DRAWINGS

In the detailed description of the preferred embodiment of the invention presented herein, reference is made to the accompanying drawings in which.

DETAILED DESCRIPTION OF THE DRAWING

Because cameras are well known, the present description will be directed in particular to elements forming part of or cooperating more directly with the present invention. The camera elements not specifically shown or described may take various forms well known to those skilled in the art.

Figure 1:
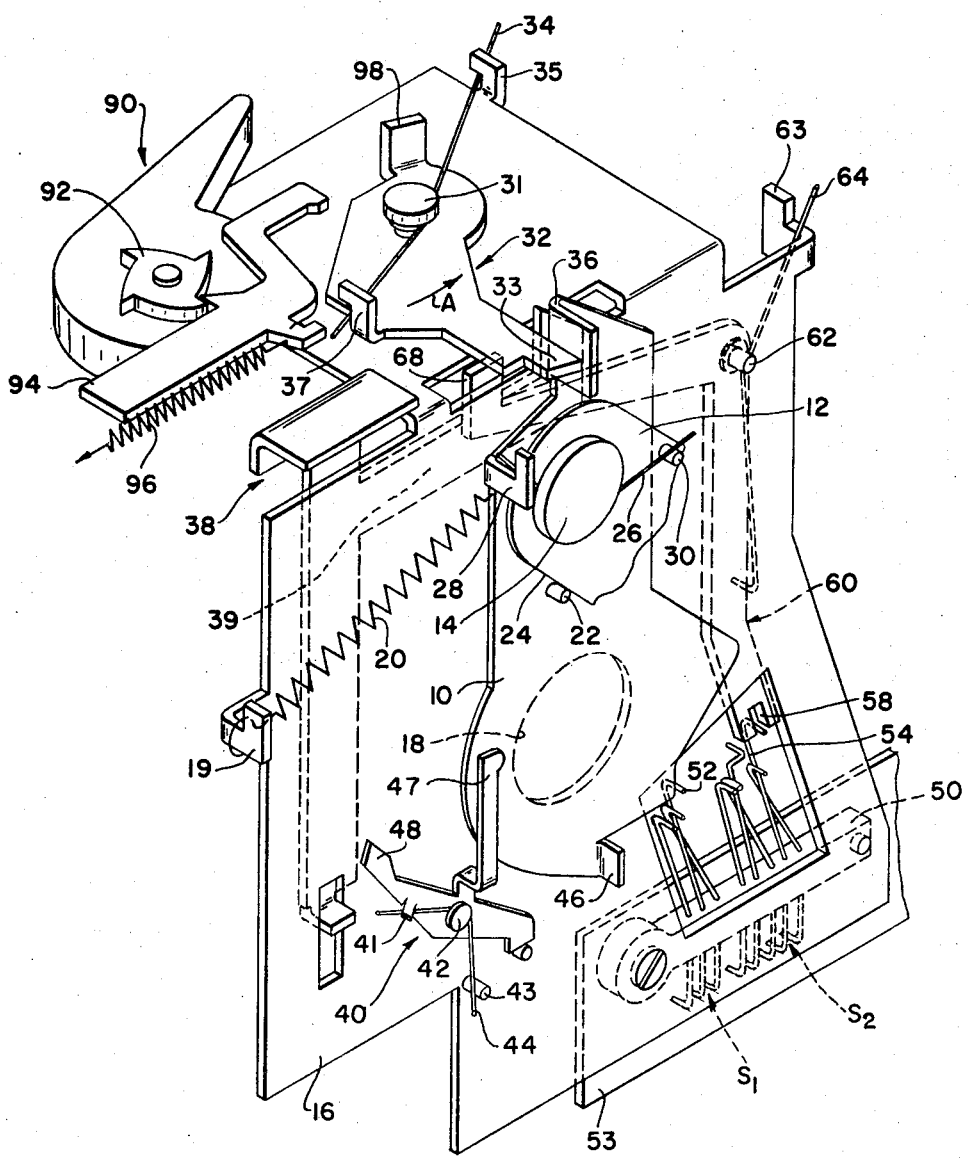
FIG. 1 is an elevational view of shutter apparatus incorporating one embodiment of the present invention wherein a control member is shown in the cocked condition.

Referring now to FIG. 1 there is shown shutter apparatus according to one illustrative embodiment of the invention, including an opening shutter blade 10 and a closing shutter blade 12, (the closing blade 12 is shown fractionally), each of which is pivotally mounted on a pin 14 attached to a camera support plate 16. The blades 10 and 12 are mounted for movement into, and out of, blocking positions with respect to an exposure aperture 18, defined by the support plate 16, to control the passage of object scene light therethrough. In the cocked condition shown in FIG. 1, the opening blade 10 is biased to an aperture blocking position by a spring 20, tensioned against an ear 19 on the support plate 16 and the opening blade 10. In the cocked position, a detent 22 on the opening blade 10 abuts edge 24 of the closing blade 12 retaining the closing blade 12 in an aperture unblocking position. A spring 26, tensioned against projection 28 on the opening blade 10 and a detent 30 on the closing blade 12, urges the closing blade 12 to an aperture blocking position. An impact driver 32 is provided for opening the opening blade 10. The impact driver 32 is pivotally mounted on a pin 31, and includes an extension 33. The impact driver 32 is biased for movement in the direction of arrow A by a spring 34, which is tensioned between a detent 35 on the support plate 16 and a detent 37 on the impact driver 32. The impact driver 32 is retained against its bias in the position shown in FIG. 1 by an angular projection 39 of a shutter release member 38. When the impact driver 32 is released, the extension 33 moves toward engagement with a projection 36 on the opening shutter blade 10. A latch 40, mounted for pivotal movement on a pin 42, on the support plate 16, is positioned in the path of movement of the opening blade 10. The movement of the latch 40 is against the bias of a spring 44, that is tensioned by pin 43 and tab 41. At the end of the opening movement of the opening blade 10, an ear 46 on the opening blade 10 engages a projection 48 on the latch 40, and the opening blade 10 is locked in an aperture exposing position. An electromagnet (not shown) is generally operable with a keeper on the closing blade 12, or a spring biased detent, to maintain the closing blade 12 in the open position.

The timed interval that the closing blade 12 remains open is determined by a light-integrating, electronic circuit (not shown) such as for example that described in U.S. Pat. No. 3,205,795. The electromagnet is controlled by the conductive or non-conductive state of a trigger circuit, such as referenced, and at the end of the time interval as determined by the electronic circuit, the electromagnet is either energized or deenergized to release the closing blade 12 for movement to block the exposure aperture 18. Typically, the operation of the electronic circuit is controlled by operation of two switches. One switch, which is energized as a shutter release member is operated prior to opening of the opening shutter blade, couples a potential source to the circuit to permit the circuit to energize the electromagnet. The electromagnet in turn, holds the closing blade in the open position. The other switch is actuated when the opening blade is opened, to start a timing function. The timing is often generated by coupling an R-C circuit, whose resistance R is a function of scene light, to the input of the trigger circuit, so that after a period of time dependent on the time instant of the R-C circuit, the trigger circuit will operate to deenergize the electromagnet to permit the closing blade to close.

Two such switches for operation with such an electronic circuit are shown in FIG. 1. A plastic, or other nonconduction material, mount 50 carries switches S1 and S2, and serves to mount the switches between the support plate 16 and a printed wiring board 53. The switches S1 and S2 are wire switches, each having a changer 52 and 54 respectively, i.e., a contact which is longer than the others. The changers 52, 54 are operated to dispose the switches to their various positions. The changer 52 of the switch S1 is in operative connection with a rear edge on the opening blade 10, and the changer 54 of the switch S2 is in operative connection with a bifurcated end 58 of a control member 60. The control member 60 is shown as an inverted L-shaped member, mounted on a pin 62 of the support plate 16. A leg spring 64, tensioned against a projection 63 on the support plate 16 and on one side of the control member 60, biases the control member 60 in a clockwise direction. An end 66 of the control member 60 is provided with a tab 68 which, in the cocked position shown in FIG. 1, engages the impact driver 32 to retain the control member 60 in the position shown in FIG. 1.

In operation of the apparatus, the release member 38 is depressed to release the impact driver 32 for movement in the direction of arrow A, where the extension 33 engages the projection 36 on the opening blade 10, and the opening blade 10 is pivoted to a position exposing the aperture 18. As the opening blade 10 moves to expose the aperture 18, the changer 52 is released and the switch S1 is actuated. Actuation of the switch S1 energizes the electronic circuit and to thus the electromagnet which holds the closing blade 12 in its aperture exposing position. When the opening blade 10 completes its movement, the detent 46 on the opening blade 10 engages the projection 48 of the latch 40 and the opening blade 10 is locked in an aperture exposing position.

Movement of the impact driver 32 releases the tab 68, and the control member 60 pivots clockwise under the influence of the leg spring 64. The movement of the control member 60 follows the movement of the opening blade 10, substantially in synchronization, so that as the opening blade 10 opens the exposure aperture 18 to pass object scene light, the control member 60 has moved to a position to actuate the switch S2. The changer 54, of the switch S2, is actuated as the bifurcated end 58, of the control member 60, is moved from its rest position to an operating position. At the end of the time interval, the closing blade 12 is released by the operation of the electronic circuit, and the aperture 18 is closed. At the end of the movement of the closing blade 12 to block the aperture 18, the closing blade 12 engages an upright member 47 of the latch 40, and pivots the latch 40 counterclockwise against the bias of the spring 44. The counterclockwise movement releases the opening blade 10 for return movement to the position of FIG. 1, under the influence of the spring 20.

Figure 2:
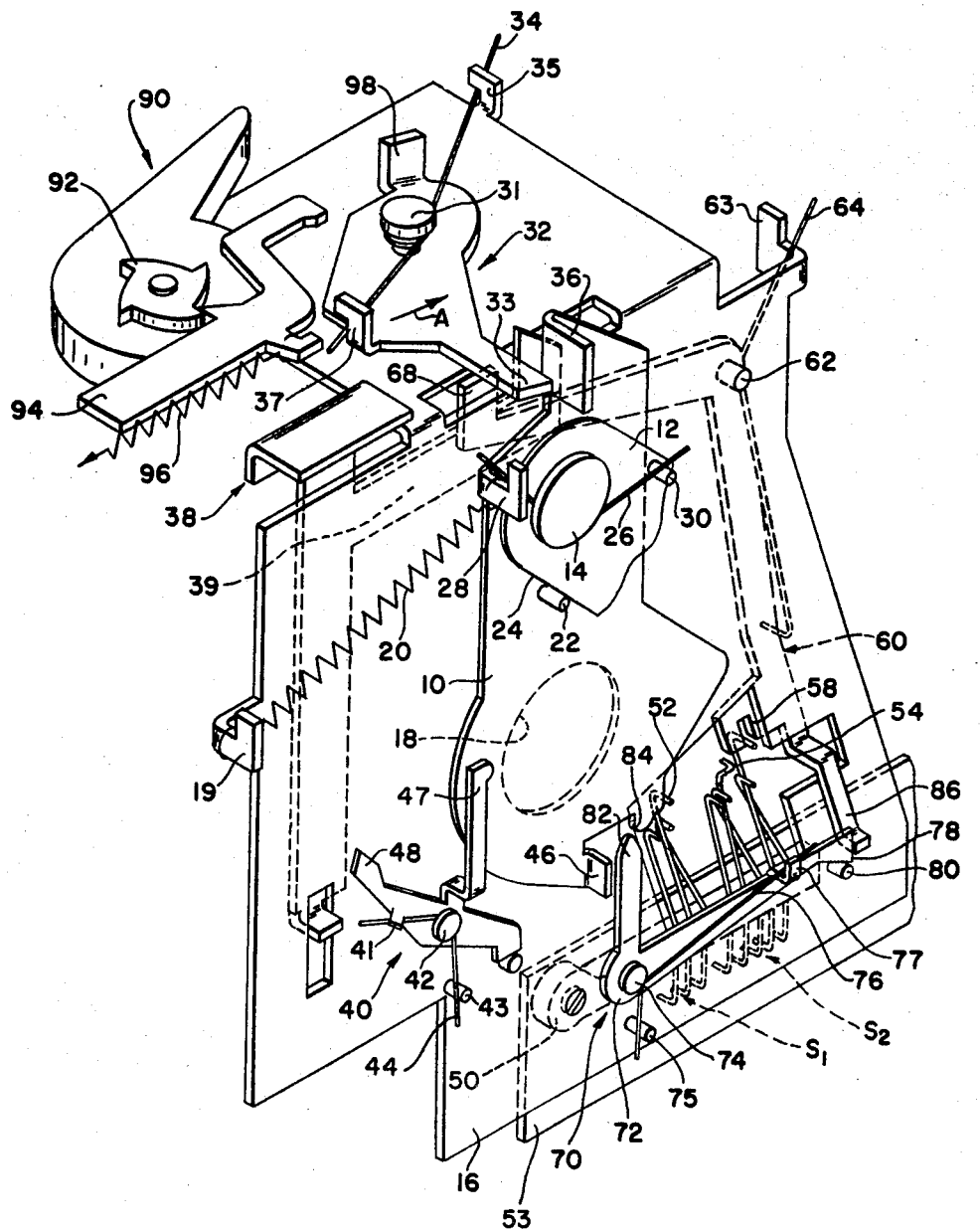
FIG. 2 is an elevational view of the apparatus of one apparatus of FIG. 1, incorporating a locking mechanism for the control member of FIG. 1.

In a second embodiment of the invention, as shown in FIG. 2, switches S1 and S2 are operated in conjunction with the operation of a locking mechanism 70. The locking mechanism 70 includes a two armed member 72, pivotally mounted on a pin 74. A leg spring 76, retained in tension by a pin 75 on the support plate 16 and a lug 77 on an arm 78 of the member 72, biases the member 72 clockwise to a position wherein the arm 78 engages a pin 80, on the support plate 16, and the member 72 is maintained in the position shown in FIG. 2. A second arm 82 is placed adjacent to, and for engagement by, a cam surface 84 on the opening shutter blade 10. The control member 60 is provided with an irregular extension 86 to the bifurcated end 58, which irregular extension 86 is positioned adjacent to the end 78 of the member 72. The locking mechanism 70 insures that the switch S2 will not be actuated prior to the opening of the opening shutter blade 10.

To operate the embodiment of FIG. 2, the sequence of operation previously described takes place. However, the motion of the control member 60 does not follow the motion of the impact driver 32 because of the engagement of the irregular extension 86 and the arm 78 of the member 72. When the impact driver 32 engages the projection 36 of the opening blade 10, the opening blade 10 is moved to the open position (not shown). As the opening blade 10 begins to pivot about the pin 14, the cam surface 84, on the opening blade 10, engages the arm 82 of the two armed member 72. The engagement of the cam surface 84 and the arm 82 momentarily pivots the member 72 counterclockwise about the pin 74. As the member 72 pivots, the arm 78 is raised which permits the irregular extension 86 of the control member 60 to move under the arm 78, and the control member 60 is free to pivot under influence of the leg spring 64 to actuate the switch S2.

The cocking of the mechanism for another exposure is effected by turning a cocking lever 90 in a counterclockwise direction. A gear member 92 on the cocking lever 90 engages a slide member 94 and the slide member 94 moves laterally against the influence of a spring 96 and engages an ear 98 on the impact driver 32. The slide 98 moves the impact driver 32 clockwise until the impact driver 32 engages, and is held by, the angle lever 39 of the release member 38. The impact driver 32, on its return motion, engages the tab 68 of the control member 60, returning the control member 60 to the position of FIG. 1, simultaneously with the cocking of the impact driver 32. When the opening blade 10 and control member 60 have been returned to the position of FIG. 1, the switches S1 and S2 are positioned for another exposure sequence.

Thus, it may be seen that the objects are accomplished by the use of the control member in conjunction with shutter control apparatus to provide a beginning time for time interval of exposure that is substantially in synchronization with the opening of the exposure aperture to pass object scene light.

The invention has been described in detail with reference to preferred embodiments thereof, but it will be understood that variations and modifications can be effected within the spirit and scope of the invention.

We claim:

1. In combination with a camera including shutter means movable to initiate and terminate an exposure and switch means for initiating a camera function, apparatus for actuating said switch means in a predetermined relationship with operating said shutter means, said apparatus comprising:

a switch actuating member movable between first and second positions;

means for urging said switch actuating member to said second position; and a retaining member mounted for movement between a position retaining said switch actuating member in said first position, and a position out of retaining relation with said switch actuating member, said retaining member being located for contact by said shutter means upon movement of said shutter means and being movable to said position out of retaining relationship by such contact, so that said urging means urges said switch actuating member to said second position.

2. Apparatus as recited in claim 1 wherein said movable member includes a first arm being in engagement with said switch actuating member, and a second arm disposed to be engaged by said shutter means as said shutter means moves to initiate an exposure, said movable member being pivoted upon engagement by said shutter means, for removing said engagement of said first arm and said switch actuating member.

* * * * *